United States Patent
Wang et al.

(10) Patent No.: US 9,992,685 B2
(45) Date of Patent: *Jun. 5, 2018

(54) MEDICAL BODY AREA NETWORK (MBAN) WITH KEY-BASED CONTROL OF SPECTRUM USAGE

(71) Applicant: KONINKLIJKE PHILIPS N.V., Eindhoven (NL)

(72) Inventors: Dong Wang, Scarsdale, NY (US); Monisha Ghosh, Chappaqua, NY (US); Delroy Smith, North Andover, MA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/426,636

(22) Filed: Feb. 7, 2017

(65) Prior Publication Data

US 2017/0150369 A1     May 25, 2017

Related U.S. Application Data

(63) Continuation of application No. 13/637,377, filed as application No. PCT/IB2011/051303 on Mar. 28, 2011, now Pat. No. 9,603,024.

(Continued)

(51) Int. Cl.
*H04W 16/14* (2009.01)
*H04W 72/04* (2009.01)
(Continued)

(52) U.S. Cl.
CPC .......... *H04W 16/14* (2013.01); *H04W 4/008* (2013.01); *H04W 72/0433* (2013.01); *H04W 72/0453* (2013.01); *H04W 84/18* (2013.01)

(58) Field of Classification Search
CPC . H04W 72/0433; H04W 16/14; H04W 4/008; H04W 72/0453; H04W 84/18
See application file for complete search history.

(56) References Cited

U.S. PATENT DOCUMENTS

| | | | |
|---|---|---|---|
| 8,417,215 B2* | 4/2013 | Baldus | C09K 11/7731 455/404.1 |
| 8,442,607 B2* | 5/2013 | Banet | A61B 5/02055 600/310 |

(Continued)

FOREIGN PATENT DOCUMENTS

| WO | 2008109641 A2 | 9/2008 |
|---|---|---|
| WO | 2009042360 A1 | 4/2009 |

OTHER PUBLICATIONS

Kanamori, Y., et al.; A Dynamic Spectrum Assignment in WiFi. WiMAX Integrated Network for Multimedia Services; 2009; IEICE Technical Report; Information and Communication Management, 109(60)89-94.

(Continued)

*Primary Examiner* — Lewis West

(57) ABSTRACT

A medical body area network (MBAN) system comprises network nodes intercommunicating via short range wireless communication. A primary user database contains information pertaining to usage of a restricted spectrum by primary users wherein the MBAN systems are secondary users of the restricted spectrum. An electronic key generation engine comprises a digital processing device configured to generate an electronic key (E-key) indicative of whether the MBAN system is allowed to use the restricted spectrum based on content of the primary users database. An MBAN application server is configured to distribute the E-key to the MBAN system. The MBAN system includes a spectrum control sub-module comprising a digital processor configured to select an operating channel or frequency for the short (Continued)

range wireless communication based at least in part on whether the E-key authorizes the MBAN system to use the restricted spectrum.

20 Claims, 1 Drawing Sheet

Related U.S. Application Data

(60) Provisional application No. 61/323,495, filed on Apr. 13, 2010.

(51) Int. Cl.
*H04W 4/00* (2018.01)
*H04W 84/18* (2009.01)

(56) References Cited

U.S. PATENT DOCUMENTS

| | | | | |
|---|---|---|---|---|
| 8,483,720 | B2* | 7/2013 | Farahani | G01S 5/0263 340/539.13 |
| 2008/0015903 | A1* | 1/2008 | Rodgers | G06F 19/327 705/3 |
| 2008/0160984 | A1* | 7/2008 | Benes | H04M 1/7253 455/419 |
| 2008/0183910 | A1* | 7/2008 | Natoli | A61B 5/00 710/15 |
| 2008/0221399 | A1* | 9/2008 | Zhou | A61B 5/021 600/301 |
| 2008/0221951 | A1* | 9/2008 | Stanforth | G06Q 10/063 705/7.41 |
| 2009/0167535 | A1 | 7/2009 | Sanchez et al. | |
| 2009/0191906 | A1* | 7/2009 | Abedi | H04W 16/14 455/501 |
| 2009/0311960 | A1* | 12/2009 | Farahani | G01S 5/0263 455/41.2 |
| 2011/0055070 | A1 | 3/2011 | Stanforth et al. | |
| 2012/0071098 | A1* | 3/2012 | Chebbo | H04W 84/18 455/41.2 |
| 2012/0089370 | A1* | 4/2012 | Chebbo | A61B 5/0002 702/188 |
| 2012/0092155 | A1* | 4/2012 | Abedi | H04W 74/0875 340/539.12 |
| 2013/0316652 | A1* | 11/2013 | Wang | H04W 48/06 455/41.2 |
| 2013/0329690 | A1* | 12/2013 | Kim | H04W 36/0072 370/329 |
| 2014/0064252 | A1* | 3/2014 | Lim | H04W 72/048 370/331 |
| 2014/0065972 | A1* | 3/2014 | Wang | A61B 5/002 455/41.2 |
| 2014/0342766 | A1* | 11/2014 | Wang | H04W 16/14 455/509 |

OTHER PUBLICATIONS

Smith, D.; Comments of Philips Healthcare Systems; Amendment of the Commission's Rules to Provide Spectrum for the Operation of Medical Body Area Networks; 2009; pp. 1-67. http://fjallfoss.gcc.gov/ecfs/document/view?id=7020040931.

Allison, A.; Reply Comments of th Boeing Company; Amendment of the Commission's Rules to Provide Spectrum for the Operation of Medical Body Area Networks; 2009; pp. 1-27. http://fjallfoss.gcc.gov/ecfs/document/view?id=7020244723.

Smith, D.; Philips Healthcare Systems Reply Comments; Amendment of the Commission's Rules to Provide Spectrum for the Operation of Medical Body Area Networks; 2009; pp. 1-50. http://fjallfoss.gcc.gov/ecfs/document/view?id=7020244837.

* cited by examiner

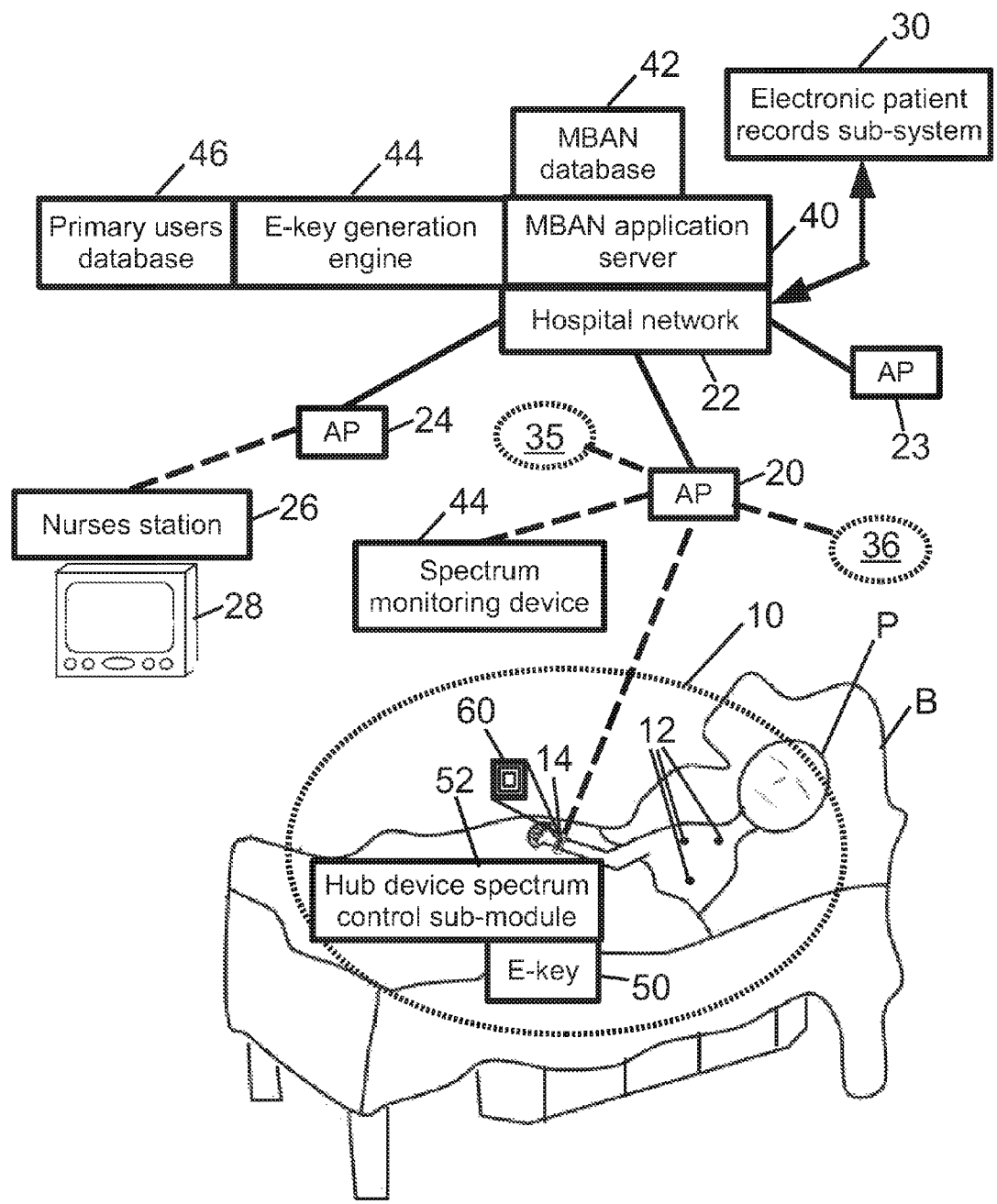

MEDICAL BODY AREA NETWORK (MBAN) WITH KEY-BASED CONTROL OF SPECTRUM USAGE

The present application is a continuation of U.S. application Ser. No. 13/637,377, filed Sep. 26, 2012, which is the U.S. National Phase application under 35 U.S.C. § 371 of International Application No. PCT/IB2011/051303, filed Mar. 28, 2011, which claims the benefit of U.S. Provisional Application No. 61/323,495, filed Apr. 13, 2010. These applications are hereby incorporated herein by reference in their entirety.

The following relates to the medical monitoring arts, wireless communication arts, and related arts.

A medical body area network (MBAN) replaces the tangle of cables tethering hospital patients to their bedside monitoring units with wireless connections. This provides low-cost wireless patient monitoring (PM) without the inconvenience and safety hazards posed by wired connections, which can trip medical personnel or can become detached so as to lose medical data. In the MBAN approach, multiple low cost sensors are attached at different locations on or around a patient, and these sensors take readings of patient physiological information such as patient temperature, pulse, blood glucose level, electrocardiographic (ECG) data, or so forth. The sensors are coordinated by at least one proximate hub or gateway device to form the MBAN. The hub or gateway device communicates with the sensors using embedded short-range wireless communication radios, for example conforming with an IEEE 802.15.4 (Zigbee) short-range wireless communication protocol. Information collected by the sensors is transmitted to the hub or gateway device through the short-range wireless communication of the MBAN, thus eliminating the need for cables. The hub or gateway device communicates the collected patient data to a central patient monitoring (PM) station via a wired or wireless longer-range link for centralized processing, display and storage. The longer-range network may, for example, include wired Ethernet and/or a wireless protocol such as Wi-Fi or some proprietary wireless network protocol. The PM station may, for example, include an electronic patient record database, display devices located at a nurse's station or elsewhere in the medical facility, or so forth.

MBAN monitoring acquires patient physiological parameters. Depending upon the type of parameter and the state of the patient, the acquired data may range from important (for example, in the case of monitoring of a healthy patient undergoing a fitness regimen) to life-critical (for example, in the case of a critically ill patient in an intensive care unit). In general, there is a strict reliability requirement on the MBAN wireless links due to the medical content of the data.

As MBAN systems become more common in a hospital or other medical facility, spectrum usage increases. This can be accommodated by allocating more spectrum to MBAN applications. However, the allocated spectrum should be of "high quality" as appropriate for transmission of important medical data. Such spectrum is highly coveted. For example, both MBAN usage and aeronautical mobile telemetry (AMT) desire to use the 2360-2390 MHz spectrum (hereinafter referred to as the "MBAN spectrum). In the United States, it has been proposed to allocate 2360-2400 MHz for MBAN on a secondary basis, with AMT being the primary user for the 2360-2390 MHz spectrum. In such a scheme, the secondary MBAN users would be required by government regulation to protect the primary AMT users in the 2360-2390 MHz spectrum space and to accept possible interference from those primary users in that spectrum space.

In order to achieve co-existence between primary users and secondary users, some restrictions (or spectrum regulation rulings) are placed on use of the shared spectrum by secondary users. By way of example, one possible restriction is to limit the secondary use of a spectrum to usage only within authorized (indoor) facilities and to prohibit out-of-door usage by the secondary services. Another possible restriction is to implement exclusion zones, which are regions surrounding AMT sites that are defined to ensure separation distance between MBAN systems and AMT receivers. In order to avoid interference to an AMT receiver, MBAN operations within part or the entire 2360-2390 MHz spectrum are proposed to be prohibited in such exclusion zones, even if the MBAN operation is limited to a healthcare facility.

To facilitate enhanced usage of MBAN systems at hospitals and other medical facilities, it has been proposed to allocate the wider 2360-2400 MHz band (the "MBAN spectrum") specifically for MBAN services. In the United States, the Federal Communications Commission (FCC) adopted an MBAN notice of proposed rulemaking (NPRM) in June 2009. Considering the wide bandwidth, interference-free and good propagation properties of the MBAN spectrum, it would be advantageous for MBAN applications to use the MBAN spectrum to provide medical-grade connectivity if the MBAN spectrum is allocated for MBAN usage.

However, the proposed allocation of the MBAN spectrum for MBAN usage is on a secondary basis, which means MBAN usage would be required by government regulation to protect all the primary users in the MBAN spectrum and to accept possible interference from those primary users. The current primary users in the MBAN spectrum include Amateur Radio (2390-2400 MHz), Aeronautical Mobile Telemetry (AMT) (2360-2395 MHz; note that currently only 2360-2390 MHz is in use by AMT); and Radio Astronomy (2370-2390 MHz).

In order to protect the primary users, especially AMT sites, it has been proposed in the United States to limit MBAN operations in the 2360-2390 MHz band to healthcare facilities only. Under this proposed regulatory scheme, MBAN devices are only allowed to operate in the 2360-2390 MHz when they are located within a healthcare facility—if an MBAN system moves outside, it is required under this proposed scheme to switch to a new channel outside the 2360-2390 MHz band. Moreover, exclusion zones, which are regions surrounding AMT sites, are proposed to be defined to ensure separation distance between MBAN systems and AMT receivers. In order to avoid interference to an AMT receiver, MBAN operations within part or the entire 2360-2390 MHz spectrum are proposed to be prohibited in such exclusion zones, even if the MBAN operation is limited to a healthcare facility.

Compliance with such a regulatory scheme is expected to be based on manual operations, and should be strict. However, strict compliance is difficult to ensure by manual approaches, at least because (1) MBAN spectrum usage is not visually perceptible; (2) some MBAN systems are mobile; and (3) the manual compliance is distributed amongst numerous human personnel, such as physicians, nurses, hospital staff, and so forth.

In a contemplated manual approach, when an MBAN system is prescribed by a health care professional to monitor a patient in a healthcare facility, a nurse or other health care staff will manually enable the hub device to use part or the entire 2360-2390 MHz spectrum based on the FCC regulation. Later, if the patient is going to move outside the healthcare facility, for example, due to discharge from hospital, a healthcare staff member will manually disable the hub device to use the 2360-2390 MHz spectrum. The manually enable/disable operations could be implemented by manually entering a passcode on the hub device or by connecting the hub device with a specific device (for example, plug a USB key on the hub device) and a program running on the hub device or the specific device could automatically enable/disable the 2360-2390 MHz spectrum access of the hub device.

However, such manual administration method employs substantial staff intervention and significantly reduces workflow efficiency in the hospital. Manual administration also is not flexible, and may fail to deal effectively with mobile AMT sites (for example, a temporal exclusion zone might be defined from time to time to protect mobile AMT sites or vehicles).

The following provides new and improved apparatuses and methods which overcome the above-referenced problems and others.

In accordance with one disclosed aspect, a medical system comprises a medical body area network (MBAN) system comprising a plurality of network nodes intercommunicating via short range wireless communication. The MBAN system includes a spectrum control sub-module that selects an operating channel or frequency for the short range wireless communication based at least in part on an electronic key specifying a usable spectrum for the short range wireless communication.

In accordance with another disclosed aspect, a method comprises: operating a medical body area network (MBAN) system comprising a plurality of network nodes intercommunicating via short range wireless communication at a selected operating channel or frequency; selecting the operating channel or frequency from a default spectrum; and selecting the operating channel or frequency from an extended spectrum comprising the default spectrum and an additional spectrum conditional upon the MBAN system having an electronic key authorizing use of the additional spectrum.

In accordance with another disclosed aspect, a medical system comprises: a medical body area network (MBAN) system comprising a plurality of network nodes intercommunicating via short range wireless communication; a primary users database containing information pertaining to usage of a restricted spectrum by primary users wherein the MBAN systems are secondary users of the restricted spectrum; an electronic key generation engine comprising a digital processing device configured to generate an electronic key (E-key) indicative of whether the MBAN system is allowed to use the restricted spectrum based on content of the primary users database; an MBAN application server configured to distribute the E-key to the MBAN system; wherein the MBAN system includes a spectrum control sub-module comprising a digital processor configured to select an operating channel or frequency for the short range wireless communication based at least in part on whether the E-key authorizes the MBAN system to use the restricted spectrum.

One advantage resides in safe co-existence of secondary users and primary users in a shared spectrum space.

Another advantage resides in more efficient spectrum usage.

Another advantage resides in principled usage of wireless communication spectrum by primary and secondary users while maintaining the strict compliance of secondary users respective to access rights of the primary users.

Further advantages will be apparent to those of ordinary skill in the art upon reading and understanding the following detailed description.

FIG. 1 diagrammatically illustrates a medical body area network (MBAN) system in the context of a medical environment including a central frequency agility sub-system as disclosed herein.

Disclosed herein is an electronic-key (i.e., "E-key") based spectrum use enforcement approach that entails little or no manual intervention and only a modest increase in MBAN system complexity as compared with manual administration approaches. In some embodiments, the E-key enforcement mechanism operates as a hierarchical solution, in which E-key generation is maintained by an assigned MBAN coordinator, E-key distribution is maintained by an MBAN application server, and E-key enforcement is integrated in MBAN hub devices (which may, by way of example, comprise an on-body pendant, a bedside monitor, or so forth). The approach provides effective MBAN spectrum access control that in suitable embodiments provides a single interface to AMT users to simplify coordination and control AMT confidential information access, and enables flexibility to provide case-by-case exclusion zone definition.

In some embodiments, the E-key generation process leverages a Wireless Medical Telemetry Service (WMTS) database concept, and is maintained by an assigned MBAN coordinator to provide single interface to AMT users. This simplifies MBAN frequency coordination, facilitates confidential AMT information access control, and ensures that MBAN users cannot access AMT information. In a suitable embodiment, the E-key generation components include an AMT database that stores AMT information provided by AMT users, an MBAN database that stores MBAN information from MBAN application servers, and an E-key generation engine that generates an E-key for each healthcare facility. The generation engine is suitably embodied by a network server, computer, digital processing device, or so forth. In some such embodiments, AMT users can access MBAN spectrum use status, which can be useful for mobile AMT site optimization.

The AMT database contains input received from AMT users. Content of the AMT Database is preferably accessed by E-key generation algorithm but not by MBAN systems, which provides access control for confidential AMT information. Some suitable AMT information that may be included in the AMT database includes: location and contact information for each AMT site; the frequency range (or, more generally, spectrum in use) by each AMT site; the AMT deployment type (e.g., fixed or mobile site); the AMT usage time period (for mobile sites); and AMT site receiver characteristics (e.g. antenna gain, height, and so forth).

The E-key generation engine is responsible for generating an E-key for each registered healthcare facility based on the parameters from AMT and MBAN databases. The generation engine has flexibility to provide case-by-case optimization, and a quick response to the establishment of a mobile AMT site. The E-key generation engine may be responsible for exclusion zone determination, insofar as calculation of an exclusion zone is optionally part of E-key generation algorithm. The Exclusion zone determination may be based on simulations and/or field measurements, or alternatively exclusion zone geographical scope can be predefined (e.g., the E-key generation engine may receive the geographical extent of the exclusion zone as an input provided by the AMT users residing within the exclusion zone). The E-key information for each healthcare facility (an E-key is generated for each healthcare facility in some suitable embodiments) may include: healthcare facility identification (ID); frequency range of available MBAN spectrum; and expiration time of the E-key.

The MBAN Database contains input received from MBAN application servers (installed in registered healthcare facilities). Content of the MBAN Database is accessed by the E-key generation engine, and is optionally also accessed by AMT users as this information may be useful for mobile AMT site optimization and to monitor MBAN spectrum usage. Some MBAN information that is suitably contained in the MBAN Database includes: hospital information such as physical address, location, contact information, building height, environment (e.g., urban or rural); the number of MBANs; and MBAN device information such as equipment type, manufacturer, deployment type (e.g., fixed or mobile); transmission (TX) Power quantified using an Effective Radiated Power (ERP) metric or other suitable metric; and the issued E-key.

An MBAN application server is responsible for E-key distribution. A suitable distribution process is as follows: obtain an E-key from the MBAN database; wait for E-key update commands from MBAN database or periodically retrieve E-key from MBAN database; generate an E-key for each registered MBAN; and distribute the E-key to registered MBAN hub devices. The frequency range of available MBAN spectrum in the generated E-Key is suitably the same as or a subset of the frequency range parameter in the E-key from MBAN database. The E-key distribution can be performed as follows. For MBAN hub devices with backhaul links (that is, links to the hospital network or other relevant communication network), the MBAN application server periodically sends E-key refresh commands to refresh E-keys stored in those hub devices. For MBAN hub devices without backhaul links, manual administration can be used to update the E-key, such as manually inputting the E-key to the hub device or plugging on a specific device that delivers the E-key to the hub device. An MBAN application server also has information about current MBAN spectrum use in its healthcare facility.

The hub device of MBAN is responsible for E-key enforcement. An illustrative embodiment disclosed herein is directed to a regulatory scheme in which 2390-2400 MHz is available for MBAN use without requirements of coordination, while 2360-2390 MHz is available for MBAN use on a secondary user basis with requirements of coordination to protect primary AMT users. In this illustrative embodiment, E-key enforcement operates as follows. By default, an MBAN hub device would only be allowed to initiate an MBAN on a channel within the 2390-2400 MHz spectrum and then MBAN sensor devices could join that MBAN. Once a hub device gets a valid E-key, it would be able to access the MBAN channels within the frequency range defined in the E-key. Only the hub device can initiate MBAN channel switch operations. If a hub device does not get an E-key update command from MBAN application server before its current E-key expires, it will move out the 2360-2390 MHz spectrum and disable the access to that spectrum. In this approach, an MBAN sensor device is not allowed to select an MBAN channel, but rather follows its hub device to switch MBAN channels. If the connection to its hub device is lost, the MBAN sensor device will keep quiet (no transmission operation) until it reestablishes connection with its hub device.

In some suitable embodiments, healthcare facility registration is done via web-based tools, similar to web-based tools used for WMTS registration. The healthcare facility provides hospital information and MBAN device information to the MBAN coordinator. The E-key generation algorithm generates an E-key for the healthcare facility if the use of the 2360-2390 MHz spectrum (part or all) is allowed. The MBAN database stores the hospital and MBAN device information and the generated E-key. The MBAN database accepts the healthcare facility registration. Once the registration is accepted, the MBAN application server is able to obtain the granted E-key from the MBANS coordinator. Based on the granted E-key, the MBAN application can generate an E-key (the same as or a subset of the E-key from MBAN database) for each activated MBAN to enable possible MBAN operations within the 2360-2390 MHz spectrum.

MBAN activation within this E-key enforcement framework is as follows. An MBAN is prescribed by a healthcare professional, and is activated for operation. During MBAN activation, an E-key is granted to the hub device. For MBANs with no backhaul link, manual administration is used to enter E-key to the hub device and update the MBAN application server with the activated MBAN information. On the other hand, if the hub of the MBAN can establish a backhaul link then it obtains an E-key from the MBAN application server first and then selects an MBAN channel within the specified available MBAN spectrum to start an MBAN. After the E-key is granted, MBAN sensor devices join the MBAN. Once the MBAN is successfully activated, the activated MBAN information is reported to MBAN application server. Thereafter, periodic E-key refresh commands (e.g. beacon signal) from the MBAN application server keep the E-key of hub device active. If the hub device cannot receive E-Key refresh commands before its E-key expires, then the access of the 2360-2390 MHz is disabled. Once a hub device receives a valid E-key from MBAN application server again (that is, after its previously received E-key expired), it is allowed to access the specified available spectrum within the 2360-2390 MHz again. MBAN sensor devices keep quiet (no transmission) if they lose the MBAN connection to the hub device.

Changes in spectrum usage by AMT sites is also readily accommodated by the disclosed E-key enforcement approach. AMT sites or AMT spectrum usage may change from time to time. For example, a new mobile AMT site may be established, or an AMT may utilize new AMT spectrum space. In such cases, the MBAN E-key system responds in a prompt and timely fashion in order to protect AMT users. A suitable approach is as follows. AMT users inform the MBAN coordinator of the planned changes and update the AMT database. The AMT database update triggers the E-key generation algorithm to verify if the current E-keys are still valid based on the new AMT information. If needed, the E-key generation algorithm generates a new E-key for affected hospitals and updates MBAN database. The MBAN database sends E-key update commands to MBAN application servers of the affected hospitals. Once an MBAN application server receives an updated E-key, it updates the E-keys of its all active MBANs by E-key refresh commands. A hub device updates its local available MBAN spectrum information once it receives an updated E-key from its MBAN application server. The hub device also checks whether its current MBAN channel is still available. If not, the hub device initiates a channel switch operation to move its MBAN to a new channel within the available spectrum. Once the hub device finishes the E-key update operation, it reports the updated MBAN information to MBAN application server and such information is further reported the MBAN coordinator to update the MBAN Database. The MBAN application server generates a warning message to prompt the required manual administration effort to update the E-keys for any MBANs without backhaul links.

With reference to FIG. 1, an illustrative embodiment of the disclosed E-key enforcement scheme is described. A medical body area network (MBAN) 10 includes a plurality of network nodes 12, 14. At least one of the network nodes 12, 14 serves as a hub device 14. The network nodes 12 communicate with the hub device 14 via a short-range wireless communication protocol. The MBAN 10 is also sometimes referred to in the relevant literature by other equivalent terms, such as a body area network (BAN), a body sensor network (BSN), a personal area network (PAN), a mobile ad hoc network (MANET), or so forth—the term medical body area network (MBAN) 10 is to be understood as encompassing these various alternative terms.

The illustrative MBAN 10 includes four illustrative network nodes 12, 14 including the hub device 14; however, the number of network nodes can be one, two, three, four, five, six, or more, and moreover the number of network nodes may in some embodiments increase or decrease in an ad hoc fashion as sensor nodes are added or removed from the network to add or remove medical monitoring capability. The network nodes 12 are typically sensor nodes that acquire physiological parameters such as heart rate, respiration rate, electrocardiographic (ECG) data, or so forth; however, it is also contemplated for one or more of the network nodes to perform other functions such as controlled delivery of a therapeutic drug via a skin patch or intravenous connection, performing cardiac pacemaking functionality, or so forth. A single network node may perform one or more functions. The illustrative network nodes 12 are disposed on the exterior of an associated patient P; however, more generally the network nodes may be disposed on the patient, or in the patient (for example, a network node may take the form of an implanted device), or proximate to the patient within the communication range of the short-range communication protocol (for example, a network node may take the form of a device mounted on an intravenous infusion pump (not shown) mounted on a pole that is kept near the patient, and in this case the monitored patient data may include information such as the intravenous fluid flow rate). It is sometimes desirable for the network nodes to be made as small as practicable to promote patient comfort, and to be of low complexity to enhance reliability—accordingly, such network nodes 12 are typically low-power devices (to keep the battery or other electrical power supply small) and may have limited on-board data storage or data buffering. As a consequence, the network nodes 12 should be in continuous or nearly continuous short-range wireless communication with the hub device 14 in order to expeditiously convey acquired patient data to the hub device 14 without overflowing the data buffer.

The hub device 14 (also sometimes referred to in the relevant literature by other equivalent terms, such as "gateway device" or "hub node") coordinates operation of the MBAN 10 by collecting (via the Zigbee, Bluetooth™, or other short-range wireless communication protocol) patient data acquired by the sensors of the network nodes 12 and transmitting the collected data away from the MBAN 10 via a longer range communication protocol. The short-range wireless communication protocol preferably has a relatively short operational range of a few tens of meters, a few meters, or less, and in some embodiments suitably employs an IEEE 802.15.4 (Zigbee) short-range wireless communication protocol or a variant thereof, or a Bluetooth™ short-range wireless communication protocol or a variant thereof. Both Bluetooth™ and Zigbee operate in a frequency spectrum of around 2.4-2.5 GHz. Although Bluetooth™ and Zigbee are suitable embodiments for the short-range wireless communication, other short-range communication protocols, including proprietary communication protocols, are also contemplated. Moreover, the short-range wireless communication can operate at other frequencies besides the 2.4-2.5 GHz range, such as ranges in the hundreds of megahertz, gigahertz, tens-of-gigahertz, or other ranges. The short-range communication protocol should have a sufficient range for the hub device 14 to communicate reliably with all network nodes 12 of the MBAN system 10. In FIG. 1, this short-range wireless communication range is diagrammatically indicated by the dotted oval used to delineate the MBAN system 10. The short-range wireless communication is typically two-way, so that the network nodes 12 can communicate information (e.g., patient data, network node status, or so forth) to the hub device 14; and the hub device 14 can communicate information (e.g., commands, control data in the case of a therapeutic network node, or so forth) to the network nodes 12. The illustrative hub device 14 is a wrist-mounted device; however, the hub device can be otherwise mounted to the patient, for example as a necklace device, adhesively glued device, cellular telephone, or so forth. It is also contemplated for the hub device to be mounted elsewhere proximate to the patent, such as being integrated with an intravenous infusion pump (not shown) mounted on a pole that is kept near the patient, or as a set-top box.

The hub device 14 also includes a transceiver (not shown) providing the longer-range communication capability to communicate data off the MBAN system 10. In the illustrative example of FIG. 1, the hub device 14 wirelessly communicates with an access point (AP) 20 of a hospital network 22. The illustrative AP 20 is a wireless access point that communicates wirelessly with the hub device 14. In the illustrative embodiment the hospital network 22 also includes additional access points, such as illustrative access points AP 23 and AP 24, that are distributed throughout the hospital or other medical facility. To provide further illustration, a nurses' station 26 is diagrammatically indicated, which is in wireless communication with the AP 24 and includes a display monitor 28 that may, for example, be used to display medical data for the patient P that are acquired by the MBAN system 10 and communicated to the nurses' station 26 via the path comprising the AP 20, the hospital network 22, and the AP 24. By way of another illustrative example, the hospital network 22 may provide access with an electronic patient records sub-system 30 in which is stored medical data for the patient P that are acquired by the MBAN system 10 and communicated to the electronic patient records sub-system 30 via the path comprising the AP 20 and the hospital network 22. The illustrative longer-range communication between the hub device 14 and the AP 20 is wireless, as diagrammatically indicated in FIG. 1 by a dashed connecting line. (Similarly, wireless communication between the AP 24 and the nurses' station 26 is indicated by a dashed connecting line). In some suitable embodiments, the longer-range wireless communication is suitably a WiFi communication link conforming with an IEEE 802.11 wireless communication protocol or a variant thereof. However, other wireless communication protocols can be used for the longer-range communication, such as another type of wireless medical telemetry system (WMTS). Moreover, the longer range communication can be a wired communication such as a wired Ethernet link (in which case the hub device includes at least one cable providing the wired longer range communication link).

The longer range communication is longer range as compared with the short-range communication between the network nodes 12 and the hub device 14. For example, while the short-range communication range may be of order a few tens of centimeters, a few meters, or at most perhaps a few tens of meters, the longer range communication typically encompasses a substantial portion of the hospital or other medical facility through the use of multiple access points 20, 23, 24 or, equivalently, multiple Ethernet jacks distributed throughout the hospital, in the case of a wired longer-range communication. Elsewhere in this application, the longer range communication 20, 22, 23, 24 is referred to as a backhaul link.

The longer-range communication, if wireless, requires more power than the short-range communication—accordingly, the hub device 14 includes a battery or other power source sufficient to operate the longer-range communication transceiver. Alternatively, the hub device 14 may include a wired electrical power connection. The hub device 14 also typically includes sufficient on-board storage so that it can buffer a substantial amount of patient data in the event that communication with the AP 20 is interrupted for some time interval. In the illustrative case of wireless longer-range communication, it is also to be understood that if the patient P moves out of range of the AP 20 and into range of another AP (for example, AP 23 or AP 24) then the IEEE 802.11 or other wireless communication protocol employed by the hospital network 22 (including its wireless access points 20, 23, 24) provides for the wireless link to shift from AP 20 to the newly proximate AP. In this regard, although the patient P is illustrated as lying in a bed B, more generally it is contemplated for the patient P to be ambulatory and to variously move into and out of range of the various access points 20, 23, 24. As the patient P thus moves, the MBAN 10 including the network nodes 12 and the hub device 14 moves together with the patient P.

In the MBAN 10, the network nodes 12 communicate with the hub device 14 via the short-range wireless communication. However, it is also contemplated for various pairs or groups of the network nodes 12 to also intercommunicate directly (that is, without using the hub device 14 as an intermediary) via the short-range wireless communication. This may be useful, for example, to coordinate the activities of two or more network nodes in time. Moreover, the hub device 14 may provide additional functionality—for example, the hub device 14 may also be a network node that includes one or more sensors for measuring physiological parameters. Still further, while the single hub device 14 is illustrated, it is contemplated for the coordinating functionality (e.g. data collection from from the network nodes 12 and offloading of the collected data via the longer range wireless communication) to be embodied by two or more network nodes that cooperatively perform the coordinating tasks.

In illustrative FIG. 1, only the single MBAN system 10 is illustrated in detail. However, it will be appreciated that more generally the hospital or other medical facility includes a plurality of patients, each having his or her own MBAN system. This is diagrammatically shown in FIG. 1 by two additional MBAN systems 35, 36 also communicating with the AP 20 via the longer range wireless communication. More generally, the number of MBAN systems may be, by way of some illustrative examples: two, three, four, five, ten, twenty, or more. Indeed, it is even contemplated for a single patient to have two or more different, independently operating MBAN systems (not illustrated).

With continuing reference to FIG. 1, an MBAN application server 40 communicates with the MBAN systems 10, 35, 36 via the longer range communication or backhaul link 20, 22, 23, 24 to perform various application tasks. By way of illustrative example, the MBAN application server 40 may perform tasks such as coordinating data transfer from the hub device 14 to the electronic patient records subsystem 30 for storage, coordinating data transfer from the hub device 14 to the display monitor 28 for display, and so forth. Toward this end, the MBAN application server 40 maintains an MBAN database 42 containing relevant information about each active MBAN system 10, 35, 36.

To provide spectrum usage control, the MBAN application server 40 further includes or has access to an electronic key (E-key) generation engine 44. The E-key generation device generates an electronic key (E-key) that specifies what spectrum is available for MBAN usage. Various limitations can exist on the available spectrum, such as: limitations imposed by primary users where MBAN communications are a secondary usage; limitations on spectrum based on region, national country, or other geographic locale; or so forth. The limitations on available spectrum may vary as a function of time, and such variation may be periodic or aperiodic.

The E-key generation engine 44 is suitably embodied by a computer, network server, or other digital processing device. The MBAN application server 44 is also suitably embodied by a computer, network server, or other digital processing device, which may be the same as or different from the digital processing device embodying the E-key generation engine 44. In some embodiments the E-key generation engine 44 is embodied as an application program executing on the MBAN application server 40.

By way of illustrative example, in the illustrative embodiment the 2360-2400 MHz spectrum is referred to in this illustrative example as the "MBAN spectrum". However, the portion from 2360-2390 MHz is allocated for MBAN usage on a secondary basis, with aeronautical mobile telemetry (AMT) users being the primary users for the 2360-2390 MHz spectrum. In the illustrative example, the limitations on MBAN usage in the 2360-2390 MHz spectrum space is implemented by regulations including: (1) limiting MBAN usage in this spectrum space to MBAN systems operating indoors in designated medical facilities and (2) defining stationary "exclusion zones" around AMT sites—no MBAN usage of the portion of the 2360-2390 MHz band that is currently in use by AMT users is allowed at any time in any such stationary exclusion zone; and (3) defining temporary exclusion zones corresponding to mobile or intermittent AMT use—no MBAN usage of the portion of the 2360-2390 MHz band that is currently in use by AMT users is allowed in such a temporary exclusion zone during the time it is in place. A consequence of (3) is that usage of part or all of the 2360-2390 MHz spectrum space in a designated medical facility may be temporarily barred during the time when a temporary exclusion zone encompassing the medical facility is in place.

The foregoing example is merely illustrative—in general, limitations may be placed on various spectrum spaces at various times and various locations as dictated by governing regulations promulgated by relevant government regulatory agencies, hospital policies, or so forth.

To implement spectrum limitations, the E-key generation engine 44 receives information on spectrum limitations. In the illustrative example, the spectrum limitations are imposed by AMT users, and accordingly the spectrum limitations (or information from which spectrum limitations can be determined) are provided to the E-key generation engine 44 in the form of a primary users (e.g., AMT) database 46. For each AMT site, some information suitably contained in the AMT Database 46 includes: site location; contact information for the AMT site; frequency range (that is, spectrum in use) by the AMT site; AMT deployment type (that is, fixed or mobile site), usage time period (relevant for a mobile site); and site receiver characteristics (e.g. antenna gain, height, or so forth). In some embodiments, the content of the AMT database 46 is accessible only by the E-key generation engine 44, but not by other persons or entities having access to the hospital network 22 or the MBAN application server 40. Such access limitation provides access control and security for confidential AMT information.

Additionally, the E-key generation engine 44 obtains information about the medical facility and/or the MBAN systems. In a suitable embodiment, the information is stored in the MBAN database 42 and is accessible by the E-key generation engine 44 either directly or via the MBAN application server 40. Some medical facility-related information suitably contained in the MBAN Database 42 includes: hospital information such as physical address, location, contact information; building height (which may be relevant for estimating the range of radio frequency interference due to MBAN operation); environment (e.g., urban or rural); number of currently active MBAN systems; number of MBAN systems authorized for concurrent operation, or so forth. The MBAN database 42 also suitably stores information about each MBAN system, such as: equipment type; manufacturer; deployment type (e.g., fixed or mobile); transmission (TX) Power, for example measured by an effective radiated power (ERP) metric; and the E-key (if any) issued to each MBAN system.

Based on the content of the AMT database 46 and the MBAN database 42, the E-key generation engine 44 determines exclusion zones (both stationary and mobile) and hence determines whether the hospital or other medical facility is located within an exclusion zone (or determines when the hospital or other medical facility is or will be located within an exclusion zone, in the case of a mobile or temporary exclusion zone). The geographical extent of an exclusion zone can be calculated based on electromagnetic simulation (or an approximation thereof, such as a assuming a circular exclusion zone centered on the AMT site and having a specified radius), field measurements, or a combination thereof. Alternatively, the geographical extent of the exclusion zone can be pre-calculated information that is stored in the AMT database 46. Based on this information, the E-key generation engine 44 generates an electronic key (E-key) indicative of the spectrum space usable for MBAN systems at the hospital or other medical facility.

In an alternative approach, the AMT user can determine which portion (if any) of the shared spectrum is to be usable by MBAN systems of the hospital or other medical facility, and the AMT database 46 can then store this spectrum information for retrieval by the E-key generation engine 44.

The E-key generated by the E-key generation engine 44 is suitably distributed to the various MBAN systems 10, 35, 36 by the MBAN application server 40 via the longer range communication or backhaul link 20, 22, 23, 24, and a copy of the E-key 50 is stored at the hub device 14 of each MBAN system 10. Optionally, the MBAN application server 40 stores information about the E-key assigned to each MBAN system 10, 35, 36. If the MBAN is not connected with a backhaul, then the E-key can be loaded manually, or using a portable USB drive, or so forth.

In some embodiments, different E-keys can be assigned to different MBAN systems within the same medical facility. For example, larger MBAN systems or MBAN systems including network nodes having stronger transmitters may be assigned a more restrictive E-key (or no E-key at all) since the larger and/or stronger-transmitting MBAN system may be more likely to interfere with a neighboring AMT site. Different E-keys may also be assigned to different MBAN systems based on their location within the medical facility. For example, a more restrictive E-key (or no E-key at all) may be assigned to MBAN systems located at elevated positions where they are more likely to produce problematic interference for AMT sites.

At the MBAN system, a spectrum control sub-module 52 of the hub device 14 (suitably embodied by software or firmware running on a digital processor of the hub device 14) assigns a channel or frequency for the short-range communication of the MBAN system 10. In one suitable approach, the spectrum control sub-module 52 of the hub device 14 assigns a channel or frequency in a default spectrum space (e.g., 2390-2400 MHz in the illustrative example), and only assigns a channel or frequency in the shared or otherwise restricted spectrum space (e.g., 2360-2390 MHz in the illustrative example) if the E-key 50 authorizes usage of this restricted spectrum space. In this way, the default operation does not impinge on any restricted spectrum, and the additional restricted spectrum is only utilized (or considered for utilization) if the E-key 50 affirmatively authorizes usage of the additional restricted spectrum.

The generated E-key can take various forms. In one suitable approach, the E-key is a single binary value, for which one binary value (e.g., "1") indicates the spectrum space 2360-2390 MHz is available for MBAN use and the other binary value (e.g., "0") indicates the spectrum space 2360-2390 MHz is not available for MBAN use. Alternatively, the E-key can specify the spectrum space using any suitable encoding. This may be appropriate in embodiments for which different portions of the spectrum may be variously available or unavailable for MBAN use, such that a single binary value is insufficient to convey the MBAN-usable spectrum.

Optionally, the E-key also includes an expiration time, which may be specified either in absolute time (i.e., a date certain on which the E-key expires) or in relative time (e.g., the E-key is valid for 24 hours, or 10 minutes, et cetera from the time of receipt at the MBAN). Specifying an expiration time advantageously ensures that an MBAN system will not use shared or otherwise restricted spectrum authorized by the E-key indefinitely (for example, after the patient wearing the MBAN system is discharged from the hospital).

Optionally, the E-key also includes a healthcare facility identification. In such embodiments, the E-key authorizes use of the shared or otherwise restricted spectrum within the identified healthcare facility. It is contemplated in such embodiments for a single MBAN system to have two or more E-keys for two or more corresponding medical facilities, so that different usable spectrums may be specified for the different facilities by the different E-keys. This may be useful, for example, if the patient transfers between different medical facilities for different treatments. In a suitable operating approach, the MBAN system determines in which facility it is currently located (and, hence, which E-key to use) based on which backhaul link with which it can connect.

In embodiments in which the E-key 50 has an expiration time, that expiration time can be selected to provide various functionality. For example, in some embodiments in which the longer range communication or backhaul link 20, 22, 23, 24, is robust and reliable and fast, the expiration time may be set to be short, e.g. of order a few minutes, or a few seconds, or less. In such embodiments, the expiration time advantageously ensures that a mobile MBAN system quickly (i.e., within a few minutes, or a few seconds, or less) vacates the restricted spectrum as soon as the MBAN system moves outside of range of the longer range communication or backhaul link 20, 22, 23, 24 (for example, because the patient leaves the medical facility).

In other embodiments the expiration time is longer, which reduces transmission load on the longer range communication or backhaul link 20, 22, 23, 24. In such embodiments other mechanisms can be employed to limit spectrum usage when the patient leaves the medical facility. For example, the MBAN system can switch to an unrestricted frequency or channel (e.g., in the 2390-2400 MHz range in the illustrative example) if the signal from the longer range communication or backhaul link 20, 22, 23, 24 is lost or becomes weak (thus possibly indicating that the MBAN system is moving away from the medical facility). In the case of controlled movement, such as patient discharge or patient transportation outside the hospital for an off-site medical procedure, the E-key may be invalidated automatically by the MBAN application server 40 (in cases in which the hub device has an operative backhaul link) or the E-key may be invalidated manually (in cases in which the hub device does not have an operative backhaul link).

One circumstance that can arise is that a given patient with an active (and mobile) MBAN may move outside of the hospital. This is of concern if the regulatory scheme only allows MBAN devices to operate in the restricted band (e.g., 2360-2390 MHz in the illustrative example) when they are located within a healthcare facility. Under such a regulatory scheme, if an MBAN system moves outside, it is required to switch to a new channel outside the restricted band (e.g., to the band 2390-2400 MHz in the illustrative example). If the expiration time of the E-key is only a few minutes, or a few seconds, or less, then this may be sufficient protection against uncontrolled patient movement. In such embodiments with fast E-key expiration, if the patient moves outside the service area of the hospital network 22, then the hub device will not be able to get E-key refresh commands from MBAN application server 40 and so once the E-key expires (i.e., in a few minutes, or a few seconds, or less), use of the 2360-2390 MHz spectrum is automatically disabled.

As another approach, if the patient only has sensor devices on-body, so that the hub device does not move outside with the patient, then the MBAN sensor devices would not be able to hear the hub device, then they would keep quiet.

As yet another approach, a radio frequency identification (RFID) tag 60 (shown diagrammatically in enlargement in diagrammatic FIG. 1, but suitably, by way of example, mounted on or in the hub device 14) disposed on the patient, on or in the hub device 14, or otherwise proximate to the (mobile) MBAN can be used in conjunction with RFID readers at doors of the medical facility to detect when the patient P enters or leaves the medical facility.

If a network node 12 (other than the hub node 14) that is currently operating at a restricted channel or frequency loses communication with the hub node 14 then the network node suitably stops communicating so as to ensure that it does not generate interference for primary users. Communication can be reestablished by the hub device 14, or alternatively the network node 12 can attempt to reestablish communication with the hub device 14 using an unrestricted frequency or channel (e.g., in the range 2390-2400 MHz in the illustrative example).

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

The invention claimed is:

1. A wireless communications device comprising:
a wireless interface for selectively communicating with at least one network node over:
a first channel located in a first spectrum, and
a second channel located in a second spectrum different from the first spectrum;
a memory; and
a processor configured to:
receive an electronic key (e-key) from a server device,
determine whether the second spectrum is available for use based on the received e-key, and
cause the wireless interface to communicate with the at least one network node over one of the first channel and the second channel dependent on whether the second spectrum is determined to be available.

2. The wireless communications device of claim 1, wherein in determining whether the second spectrum is available for use based on the received e-key, the processor is configured to determine whether the e-key carries a flag indicating that the second spectrum is available.

3. The wireless communications device of claim 1, wherein:
the wireless interface is capable of communicating via a plurality of channels located in the second spectrum, the second channel belonging to the plurality of channels;
in determining whether the second spectrum is available for use based on the received e-key, the processor is configured to determine whether the e-key identifies an available frequency range; and
in causing the wireless interface to communicate with the at least one network node over one of the first channel and the second channel dependent on whether the second spectrum is determined to be available, the processor is configured to select the second channel from the plurality of channels based on the channel belonging to the available frequency range identified by the e-key.

4. The wireless communications device of claim 1, wherein in determining whether the second spectrum is available for use based on the received e-key, the processor is configured to:
determine whether the e-key has expired, and
determine that the second spectrum is not available for use in response to determining that the e-key has expired.

5. The wireless communications device of claim 4, wherein the e-key carries an expiration time and, in determining whether the e-key has expired, the processor is configured to determine whether the expiration time has elapsed.

6. The wireless communications device of claim 1, further comprising a second network interface for communicating with at least one other device, wherein:
the processor receives the e-key from the second network interface via a first network, and in determining whether the second spectrum is available for use based on the received e-key, the processor is configured to determine whether the second network interface remains connected to the first network.

7. The wireless communications device of claim 1, wherein:
the memory stores a configuration indicating one of: a first device category and a second device category;
in receiving the e-key, the processor is configured to receive a first e-key associated with the first device category and a second e-key associated with the second device category; and
in determining whether the second spectrum is available for use based on the received e-key, the processor is configured to:
determine whether the second spectrum is available for use based on the first e-key when the configuration indicates the first device category, and
determine whether the second spectrum is available for use based on the second e-key when the configuration indicates the second device category.

8. The wireless communications device of claim 1, wherein the processor is further configured to:
receive, from an RFID device, an indication that a patient has exited an area approved for use of the wireless communications device;
in response to receiving the indication, determine that the second spectrum is unavailable for use.

9. A method for wireless communication performed by a processor, the method comprising:
initiating wireless communication with at least one network node via a first channel located in a first spectrum;
receiving an electronic key (e-key) from a server device; and
switching the wireless communication with the at least one network node to a second channel located in a second spectrum different from the first spectrum based on the e-key.

10. The method of claim 9 further comprising:
after switching the wireless communication with the at least one network node to the second channel, determining that the e-key has expired;
in response to determining that the e-key has expired, switching the wireless communication with the at least one network node to one of: the first channel and a third channel within the first spectrum.

11. The method of claim 10, wherein the e-key is associated with a first expiration time when the e-key is received from the server device, the method further comprising:
receiving an e-key update from the server device; and
associating the e-key with a second expiration time different from the first expiration time based on the e-key update.

12. The method of claim 9 further comprising:
after switching the wireless communication with the at least one network node to the second channel, receiving a revocation of the e-key from the server;
in response to receiving the revocation, switching the wireless communication with the at least one network node to one of: the first channel and a third channel within the first spectrum.

13. The method of claim 9 wherein the e-key specifies a range of frequencies as available for use, the method further comprising:
selecting a channel within the range of frequencies, wherein the selected channel is the second channel.

14. The method of claim 9, wherein
the e-key comprises a first e-key associated with a first network and a second e-key associated with a second network, and
switching the wireless communication with the at least one network node to the second channel located in the second spectrum based on the e-key comprises:
determining to which of the first network and the second network a network interface associated with the processor is currently connected,
switching the wireless communication based on the first key when the network interface is connected to the first network, and
switching the wireless communication based on the second key when the network interface is connected to the second network.

15. The method of claim 9, wherein the e-key is associated with a network, the method further comprising:
determining that a network interface associated with the processor is connected to a different network other than the network with which the e-key is associated; and
in response to determining that the network interface is connected to the different network, switching the wireless communication with the at least one network node to one of: the first channel and a third channel within the first spectrum.

16. The method of claim 9, wherein:
the e-key comprises a first e-key associated with the first device category and a second e-key associated with the second device category, and
switching the wireless communication with the at least one network node to the second channel based on the e-key:
determining that the processor is current configured as belonging to the first device category; and
switching the wireless communication with the at least one network node to the second channel based on the first e-key in based on determining that the processor is current configured as belonging to the first device category.

17. The method of claim 9, further comprising:
receiving, from an RFID device, an indication that a patient has exited an area approved for use of the processor;
in response to determining that patient has exited the area, switching the wireless communication with the at least one network node to one of: the first channel and a third channel within the first spectrum.

18. A non-transitory storage medium encoded with instructions for execution by a processor, the non-transitory storage medium comprising:
instructions for communicating with at least one network node via a wireless interface selectively via:
a first channel located in a first spectrum, and
a second channel located in a second spectrum different from the first spectrum;
instructions for receiving an electronic key (e-key) from a server device;
instructions determining whether the second spectrum is available for use based on the received e-key, and
instructions for causing the wireless interface to communicate with the at least one network node over one of the first channel and the second channel dependent on whether the second spectrum is determined to be available.

19. The non-transitory storage medium of claim 18 further comprising:
  instructions for determining whether the e-key has expired, and
  instructions for determining that the second spectrum is not available for use in response to determining that the e-key has expired.

20. The non-transitory storage medium of claim 18 wherein the instructions for determining whether the second spectrum is available for use based on the received e-key comprise:
  instructions for determining whether the second spectrum is available for use based on a first e-key when a local configuration indicates a first device category, and
  instructions for determining whether the second spectrum is available for use based on a second e-key different from the first e-key when the configuration indicates a second device category different from the first device category.

* * * * *